United States Patent Office 3,050,531
Patented Aug. 21, 1962

3,050,531
SUBSTITUTED 10-PHOSPHATRICYCLO [$3 \cdot 3 \cdot 1 \cdot 1^{3,7}$] DECANES AND METHODS OF PREPARING SAME
Martin Epstein and Sheldon A. Buckler, Stamford, Conn., assignors to American Cyanamid Company, New York, N.Y., a corporation of Maine
No Drawing. Filed July 6, 1960, Ser. No. 41,027
9 Claims. (Cl. 260—340.7)

The present invention relates to 1,3,5,7-tetraalkyl-2-oxa-6,9 - substituted - 10 - phosphatricyclo[$3 \cdot 3 \cdot 1 \cdot 1^{3,7}$]decanes and methods of preparing same. More particularly, the instant discovery relates to the preparation of 1,3,5,7-tetraalkyl - 2 - oxa - 6,9 - substituted - 10 - phosphatricyclo[$3 \cdot 3 \cdot 1 \cdot 1^{3,7}$]decanes by reacting phosphine or a primary phosphine with an alkyl-$\beta$-diketone.

The invention described herein quite unexpectedly and in a straightforward manner provides a novel class of compounds which, as will be seen hereinafter, are useful as gasoline additives and as intermediates for the preparation of desirable derivatives.

Pursuant to a particular embodiment of the present invention, phosphine is reacted with 2,4-pentanedione in the presence of hydrochloric acid to yield 1,3,5,7-tetramethyl - 2,6,9 - trioxa - 10 - phosphatricyclo[$3 \cdot 3 \cdot 1 \cdot 1^{3,7}$]-decane:

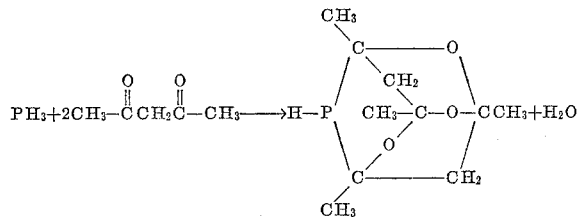

According to still another embodiment of the instant discovery a primary phosphine, such as isobutylphosphine, is reacted with an alkyl-$\beta$-diketone, such as 3,5-heptanedione, in the presence of methane-sulfonic acid to yield 1,3,5,7 - tetraethyl - 10 - isobutyl - 2,6,9 - trioxa - 10-phosphatricyclo[$3 \cdot 3 \cdot 1 \cdot 1^{3,7}$]decane:

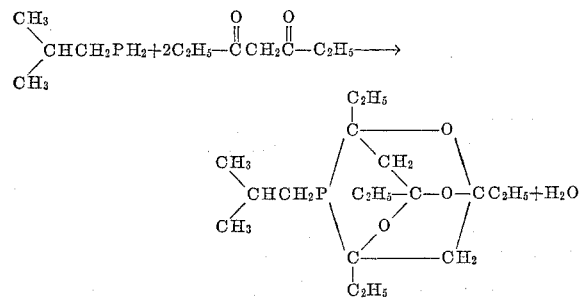

Generically, the products of the present invention are represented by the following formula

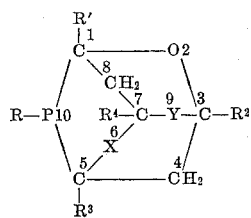

wherein X is a member selected from the group consisting of $$-O- \text{ and } -\overset{R}{\underset{|}{P}}-$$

R is H or the residue of a primary phosphine; Y is a member selected from the group consisting of $$-O- \text{ and } -\overset{R}{\underset{|}{P}}-$$

R' is a member selected from the group consisting of $CF_3$ and lower alkyl; $R^2$, $R^3$ and $R^4$, respectively, likewise represent a member selected from the group consisting of $CF_3$ and lower alkyl.

As indicated by the equations given above, the R moiety in the general formula just given is derived from phosphine or a primary phosphine reactant. Similarly, whenever X and/or Y represent $$-\overset{R}{\underset{|}{P}}-$$

this latter moiety originates from phosphine or a primary phosphine reactant.

Typical primary phosphine reactants useful for preparing the compounds of the instant discovery are phenylphosphine, methylphosphine, ethylphosphine, butylphosphine, octylphosphine, cyclohexylphosphine, dodecylphosphine, isopropylphosphine, allylphosphine, 2-hydroxyethylphosphine, benzylphosphine, para-chlorophenylphosphine, isobutylphosphine, 2-carboethoxyethylphosphine, 2-cyanoethylphosphine, and the like. It follows from the above listing that typical substituents within the purview of the present invention, i.e., substituents which do not enter into the reaction, are inert under the conditions of the reaction, are nitrile, lower alkoxy, halogen, hydroxy, carboalkoxy (lower), and the like.

The $\beta$-diketones within the purview of the instant discovery are hexafluoro-substituted pentanedione, such as 1,1,1,5,5,5 - hexafluoro - 2,4 - pentanedione, 2,4-pentanedione, 3,5-heptanedione, 2,4-hexanedione, 4,6-nonanedione, 5,7-undecanedione, and other like alkyl($C_5$–$C_{11}$)-$\beta$-diketones.

The reactions of the present invention are carried out rather readily within a wide range of temperatures. For example, temperatures on the order of $-20°$ C. to $200°$ C., consistent with practicality, are contemplated herein. Preferably, however, temperatures in the range of $15°$ C. to $80°$ C., usually ambient temperatures, are employed.

Likewise, while reactions are usually carried out at atmospheric pressure, sub-atmospheric and super-atmospheric pressure may be employed, particularly when temperatures in the higher portion of the range just given are employed. When phosphine is the reactant, for instance, pressures on the order of 20 pounds per square inch to 80 pounds per square inch are very suitable; nevertheless, pressures as high as 1500 pounds per square inch or greater are contemplated.

As will be seen hereinafter, stoichiometric amounts of the reactants are generally employed, e.g., 1, 2 or 3 molar equivalents of the phosphine or primary phosphine react with 2 molar equivalents of the alkyl-$\beta$-diketone reactant to produce the corresponding tri-oxygen, di-oxygen, or mono-oxygen-containing decane product. However, amounts greater than these indicated may be employed. For example, an excess in which 20 molar equivalents or more of the phosphine or primary phosphine reactant for every 2 molar equivalents of diketones may be employed to yield the mono-oxygen-containing diketone, X and Y representing $$-\overset{R}{\underset{|}{P}}-$$

moieties, respectively.

Other than mineral acids, such as HCl, $H_2SO_4$, HBr, $H_3PO_4$, $HNO_3$, HI, and the like, other strong acids, such as inert organic acids, may be employed. Typical of these are alkyl- or aryl-phosphonic or sulfonic acids, such as methanesulfonic acid, benzenesulfonic acid, benzenephosphonic acid, and the like. Characteristically, all of these inorganic and organic acids are, under the reaction conditions contemplated herein, inert with respect to the reactants and their reaction products.

By the same token, the reactions contemplated herein may be carried out in an aqueous medium; an alcohol medium, such as that of ethyl alcohol, methyl alcohol; an ether medium, such as that of diethylether, dioxane, tetrahydrofuran; a hydrocarbon medium, such as that of benzene, xylene, toluene, hexane; an acetone medium; and the like. As is evident, numerous inert organic solvents may be employed. By inert is meant that the solvents under the conditions of the reaction do not react to any substantial degree with the reactants and their products, and in addition are inert with respect to the strong inorganic and organic acids employed in the reaction.

The processes contemplated herein may be carried out batchwise, continuously or semi-continuously. In addition, the reactants may be brought together in numerous ways. This will be all the more evident from the examples, infra.

The novel compounds of the present invention are useful as gasoline additives. For example, up to about 10 grams of any one of these compounds, when dissolved in one gallon of gasoline, affords protection against misfiring, surface ignition, and the like.

The instant discovery will best be understood by reference to the following illustrative examples:

EXAMPLE I

*1,3,5,7-Tetramethyl-2,6,9-Trioxa-10-Phosphatricyclo [3·3·1·1$^{3,7}$]Decane*

Into a 250-milliliter pressure bottle connected to and in communication with a reservoir containing phosphine gas under 4 atmospheres pressure, the pressure bottle being mounted on a shaking device, is placed a solution of 30.0 grams (0.3 mole) of 2,4-pentanedione in 40 milliliters of concentrated hydrochloric acid (37 percent by weight HCl) and 60 milliliters water. The space above this solution is filled with nitrogen gas and evacuated. Phosphine gas from the reservoir is then admitted to the pressure bottle and the reaction carried out under 2–3 atmospheres of phosphine. After 1½ hours 0.15 mol of phosphine is taken up. The excess phosphine gas is evacuated and the pressure bottle is filled with nitrogen gas. The resulting mixture is thrown onto ice with stirring. A white solid is collected and dried to give 26.3 grams (81 percent yield) of 1,3,5,7-tetramethyl-2,6,9-trioxa - 10 - phosphatricyclo[3·3·1·1$^{3,7}$]decane, melting point 89° C.–90° C. A purer sample is prepared by recrystallization from methanol-water, melting point 89° C.–90° C.

Analysis calculated for $C_{10}H_{17}O_3P$: C, 55.55; H, 7.93; P, 14.33. Found: C, 55.51; H, 7.95; P, 14.15.

EXAMPLE II

*1,3,5,7-Tetramethyl-10-Isobutyl-2,6,9-Trioxa-10-Phosphatricyclo[3·3·1·1$^{3,7}$]Decane*

A solution of 5.5 grams of isobutylphosphine (0.06 mole), 12.2 grams of 2,4-pentanedione (0.12 mole), 35 milliliters of benzene and 2 milliliters of methane-sulfonic acid is allowed to stand for 24 hours under nitrogen. Water is added and the organic layer separated, dried over anhydrous sodium sulfate and the benzene is distilled at reduced pressure to yield 10.1 grams (61 percent yield) of 1,3,5,7 - tetramethyl-10-isobutyl-2,6,9-trioxa-10-phosphatricyclo[3·3·1·1$^{3,7}$]decane, melting point 68° C.–73° C. An analytical sample is prepared by recrystallization from isoproponol, melting point 75° C.–77° C.

Analysis calculated for $C_{14}H_{25}O_3P$: C, 61.74; H, 9.25; P, 11.38. Found: C, 61.81; H, 9.11; P, 11.70.

EXAMPLE III

*1,3,5,7-Tetramethyl-10-Octyl-2,6,9-Trioxa-10-Phosphatricyclo[3·3·1·1$^{3,7}$]Decane*

A solution of 5.8 grams of octylphosphine (0.04 mole), 8.5 grams of 2,4-pentanedione (0.08 mole) and 30 milliliters of concentrated hydrochloric acid is allowed to stand for 24 hours in a nitrogen atmosphere. The solution is poured onto ice with stirring. A solid precipitates which is collected and dried to give 10.5 grams (80 percent yield) of 1,3,5,7-tetramethyl-10-octyl-2,6,9-trioxa-10-phosphatricyclo [3·3·1·1$^{3,7}$]decane. A purer sample is prepared by recrystallization from methanol-water, melting point 42° C.–43° C.

Analysis calculated for $C_{18}H_{33}O_3P$: C, 65.82; H, 10.13; P, 9.43. Found: C, 65.62; H, 9.94; P, 9.54.

EXAMPLE IV

*1,3,5,7-Tetramethyl-10-Phenyl-2,6,9-Trioxa-10-Phosphatricyclo[3·3·1·1$^{3,7}$]Decane*

A solution of 8.4 grams of phenylphosphine (0.076 mole), 15.5 grams of 2,4-pentanedione (0.16 mole), 20 milliliters of concentrated hydrochloric acid and 15 milliliters of ethanol is allowed to stand at 25° C. for 24 hours. A solid precipitates and is collected, melting point 104° C.–107° C., and identified as 1,3,5,7-tetramethyl - 10 - phenyl - 2,6,9 - trioxa - 10 - phosphatricyclo [3·3·1·1$^{3,7}$]decane (41 percent yield). A pure sample is obtained upon recrystallization from ethanol, melting point 105° C.–107° C.

Analysis calculated for $C_{16}H_{21}O_3P$: C, 65.74; H, 7.24; P, 10.60. Found: C, 65.68; H, 7.43; P, 10.83.

EXAMPLE V

*1,3,5,7-Tetramethyl-6,10-Di-Cyanoethyl-2,9-Dioxa-6,10-Diphosphatricyclo[3·3·1·1$^{3,7}$]Decane*

A solution of 9.5 grams of 2-cyanoethylphosphine (0.11 mole), 11.0 grams of 2,4-pentanedione (0.11 mole), 75 milliliters of benzene and 2 milliliters of methansulfonic acid is refluxed for 4 hours in an atmosphere of nitrogen. Water is added, the organic layer separated, dried over anhydrous sodium sulfate and evaporated at reduced pressure. The resulting solid, weighing 2.5 grams, is recrystallized from isopropanol to yield an analytical sample of 1,3,5,7-tetramethyl-6,10-di-cyanoethyl-2,9-dioxa-6,10-diphosphatricyclo[3·3·1·1$^{3,7}$]decane, melting point 188° C.–189° C.

Analysis calculated for $C_{16}H_{24}N_2O_2P_2$: C, 56.80; H, 7.15; N, 8.28; P, 8.31. Found: C, 56.33; H, 7.11; N, 8.07; P, 8.07.

EXAMPLE VI

*1,3,5,7-Tetramethyl-6,10-Dicyclohexyl-2,9-Dioxa-6,10-Diphosphatricyclo[3·3·1·1$^{3,7}$]Decane*

A solution of 9.3 grams of cyclohexylphosphine (0.08 mole), 8.0 grams of 2,4-pentanedione (0.08 mole), 30 milliliters of concentrated hydrochloric acid and 20 milliliters of ethanol is refluxed for two hours in a nitrogen atmosphere. The ethanol is evaporated and the solution poured onto ice to give 1,3,5,7-tetramethyl-6,10-dicyclohexyl - 2,9 - dioxa - 6,10 - diphosphatricyclo[3·3·1·1$^{3,7}$]decane. An analytical sample is recrystallized from acetonitrile, melting point 123° C.–125° C.

Analysis calculated for $C_{22}H_{38}O_2P_2$: C, 66.64; H, 9.66; P, 15.63. Found: C, 66.88; H, 9.55; P, 15.35.

EXAMPLE VII

*1,3,5,7-Tetramethyl-6,9,10-Triphenyl-2-Oxa-6,9,10-Triphosphatricyclo[3·3·1·1$^{3,7}$]Decane*

A solution of 10.5 grams of phenylphosphine (0.09 mole), 6.0 grams of 2,4-pentanedione (0.06 mole), 20 milliliters of concentrated hydrochloric acid and 20 milliliters of ethanol is heated at 50° C. for one hour in a nitrogen atmosphere. The white solid that precipitates on cooling is filtered, and recrystallized from acetonitrile to yield an analytical sample of 1,3,5,7-tetramethyl-6,9,10-triphenyl - 2 - oxa - 6,9,10 - triphosphatricyclo[3·3·1·1³,⁷]decane, melting point 238° C.–239° C.

Analysis calculated for $C_{28}H_{31}OP_3$: C, 70.58; H, 6.56; P, 19.50; molecular weight 476.5. Found: C, 70.62; H, 6.71; P, 19.56; molecular weight 489.

EXAMPLE VIII

*1,3,5,7-Tetra(Trifluoromethyl)-2,6,9-Trioxa-10-Phosphatricyclo[3·3·1·1³,⁷]Decane*

Phosphine is reacted with 22.0 grams of 1,1,1,5,5,5-hexafluoro-2,4-pentanedione (0.1 mole) dissolved in 50 milliliters of benzene and 1 milliliter of methanesulfonic acid by the same method as described in Example I, above. The resulting solution is distilled and the product collected (boiling point 83° C.–85° C./1.5 mm. Hg). Recrystallization from n-hexane gives a purer sample, melting point 72° C.–75° C.

EXAMPLE IX

*1,3,5,7-Tetraethyl-6,10-Di(p-Chlorophenyl)-2,9-Dioxa-6,10-Diphosphatricyclo[3·3·1·1³,⁷]Decane*

The procedure of Example VI is repeated using 9.2 grams of p-chlorophenylphosphine (0.064 mole), 8.2 grams of 3,5-heptanedione (0.064 mole), 30 milliliters of concentrated hydrochloric acid and 20 milliliters of ethanol. The product is 1,3,5,7-tetraethyl-6,10-di(p-chlorophenyl) - 2,9 - dioxa - 6,10-diphosphatricyclo-[3·3·1·1³,⁷]decane.

EXAMPLE X

*1,3,5,7 - Tetra(Trifluoromethyl) - 6,9,10 - Tri(2 - Hydroxyethyl) - 2 - Oxa - 6,9,10 - Triphosphatricyclo-[3·3·1·1³,⁷]Decane*

The same procedure as Example VII is repeated using 7.8 grams of 2-hydroxyethylphosphine (0.1 mole), 13.6 grams of 1,1,1,5,5,5-hexafluoro-2,4-pentanedione (0.066 mole), 30 milliliters of concentrated hydrochloric acid and 30 milliliters of ethanol. The product is 1,3,5,7-tetra-(trifluoromethyl) - 6,9,10 - tri(2 - hydroxyethyl) - 2 - oxa-6,9,10-triphosphatricyclo[3·3·1·1³,⁷]decane.

EXAMPLE XI

*1,3,5,7-Tetrapropyl-10-Dodecyl-2,6,9-Trioxa-10-Phosphatricyclo[3·3·1·1³,⁷]Decane*

The procedure of Example II is repeated using 5.0 grams of n-dodecylphosphine (0.025 mole), 7.8 grams of 4,6-nonanedione (0.05 mole), 50 milliliters of benzene and 1 milliliter benzene sulfonic acid. The product is 1,3,5,7 - tetrapropyl - 10 - dodecyl - 2,6,9 - trioxa - 10-phosphatricyclo[3·3·1·1³,⁷]decane.

EXAMPLE XII

*3,7-Dimethyl-1,5-Diethyl-10-Benzyl-2,6,9-Trioxa-10-Phosphatricyclo[3·3·1·1³,⁷]Decane*

The procedure of Example III is repeated using 6.2 grams of benzylphosphine (0.05 mole) and 11.4 grams of 2,4-hexanedione (0.1 mole). The product is 3,7-dimethyl - 1,5 - diethyl - 10 - benzyl - 2,6,9 - trioxa - 10-phosphatricyclo[3·3·1·1³,⁷]decane.

EXAMPLE XIII

*1,3,5,7-Tetrabutyl-10-(2-Carboethoxyethyl)-2,6,9-Trioxa-10-Phosphatricyclo[3·3·1·1³,⁷]Decane*

The procedure of Example II is repeated using 6.7 grams of 2-carboethoxyethylphosphine (0.05 mole) and 18.8 grams of 5,7-undecanedione (0.1 mole). The product is 1,3,5,7-tetrabutyl-10-(2-carboethoxyethyl)-2,6,9-trioxa-10-phosphatricyclo[3·3·1·1³,⁷]decane.

EXAMPLE XIV

*1,3,5,7-Tetramethyl-6,10-Diallyl-2,9-Dioxa-6,10-Diphosphatricyclo[3·3·1·1³,⁷]Decane*

The procedure of Example V is repeated using 7.4 grams of allylphosphine (0.1 mole) and 10.0 grams of 2,4-pentanedione (0.1 mole). The product is 1,3,5,7-tetramethyl - 6,10 - diallyl - 2,9 - dioxa - 6,10 - diphosphatricyclo[3·3·1·1³,⁷]decane.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A 1,3,5,7 - tetraalkyl - 2 - oxa - 10 - phosphatricyclo-[3·3·1·1³,⁷]decane of the formula

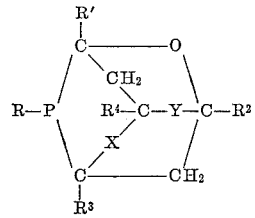

wherein X and Y each represent a member selected from the group consisting of

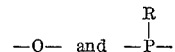

$R'$, $R^2$, $R^3$ and $R^4$ each represent a member selected from the group consisting of $CF_3$ and lower alkyl; and R is a member selected from the group consisting of H and the residue of a primary phosphine.

2. 1,3,5,7 - tetramethyl - 2,6,9 - trioxa - 10 - phosphatricyclo[3·3·1·1³,⁷]decane.

3. 1,3,5,7 - tetramethyl - 10 - isobutyl - 2,6,9 - trioxa-10-phosphatricyclo[3·3·1·1³,⁷]decane.

4. 1,3,5,7 - tetramethyl - 10 - octyl - 2,6,9 - trioxa - 10-phosphatricyclo[3·3·1·1³,⁷]decane.

5. 1,3,5,7 - tetra - trifluoromethyl - 2,6,9 - trioxa - 10-phosphatricyclo[3·3·1·1³,⁷]decane.

6. 1,3,5,7 - tetrapropyl - 10 - phenyl - 2,6,9 - trioxa - 10-phosphatricyclo[3·3·1·1³,⁷]decane.

7. 1,3,5,7 - tetrabutyl - 10 - cyclohexyl - 2,6,9 - trioxa-10-phosphatricyclo[3·3·1·1³,⁷]decane.

8. A method which comprises bringing together into intimate contact in the presence of a strong acid a member selected from the group consisting of phosphine and a primary phosphine with at least 2 molar equivalents a member selected from the group consisting of an alkyl-β-diketone and a fluoro-substituted alkyl-β-diketone and recovering the corresponding 1,3,5,7-tetraalkyl-2-oxa-10-phosphatricyclo[3·3·1·1³,⁷]decane of the formula

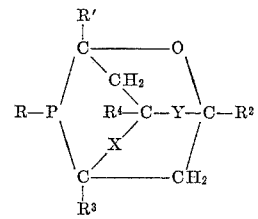

wherein X and Y each represent a member selected from the group consisting of

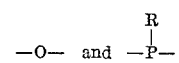

R is a member selected from the group consisting of H and the residue of an inert primary phosphine; and $R'$, $R^2$, $R^3$ and $R^4$ each represent a member selected from the group consisting of $CF_3$ and lower alkyl.

9. The process of claim 1 wherein the acid is a mineral acid.

No references cited.

UNITED STATES PATENT OFFICE
CERTIFICATE OF CORRECTION

Patent No. 3,050,531                          August 21, 1962

Martin Epstein et al.

It is hereby certified that error appears in the above numbered patent requiring correction and that the said Letters Patent should read as corrected below.

Column 6, line 73, for the claim reference numeral "1" read -- 8 --.

Signed and sealed this 24th day of December 1963.

(SEAL)
Attest:
ERNEST W. SWIDER

EDWIN L. REYNOLDS

Attesting Officer

Acting Commissioner of Patents